Kendall & Hathaway,
Polishing Glass.
N° 79,132.  Patented June 23, 1868.
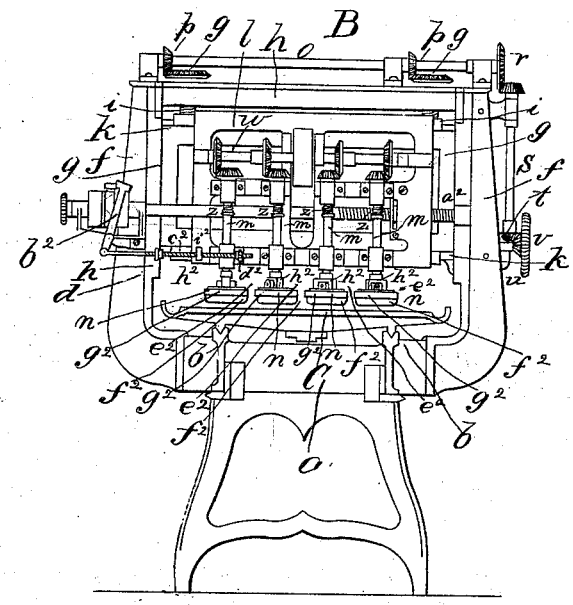
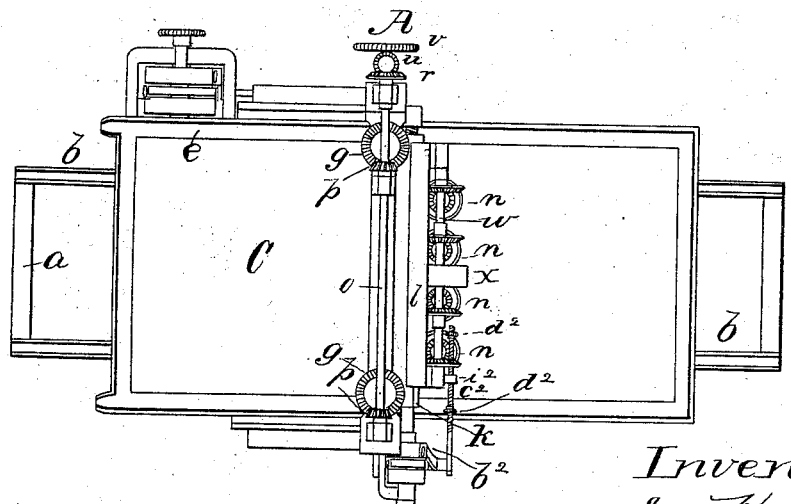
Witnesses;
G. B. Kidder
M. W. Frothingham.
Inventors;
J. Kendall
Per. A. Hathaway
Crosby, Halstead & Gould
Attys.

United States Patent Office.

JONAS KENDALL, OF SOUTH FRAMINGHAM, AND ADDISON HATHAWAY, OF LENOX, ASSIGNORS TO ANDREW T. SERVEN, OF LENOX, MASSACHUSETTS.

*Letters Patent No. 79,132, dated June 23, 1868.*

IMPROVED MACHINE FOR POLISHING GLASS.

The Schedule referred to in these Letters Patent and making part of the same.

TO ALL WHOM IT MAY CONCERN:

Be it known that we, JONAS KENDALL, of South Framingham, Middlesex county, and ADDISON HATHAWAY, of Lenox, Berkshire county, all in the State of Massachusetts, have invented an Improved Machine for Polishing Glass, &c.; and we do hereby declare that the following, taken in connection with the drawings which accompany and form part of this specification, is a description of our invention sufficient to enable those skilled in the art to practise it.

The invention relates to the construction and arrangement of mechanism designed particularly for polishing glass plates.

The general organization of the machine embodying our improvements consists in a horizontal table for holding the plate to be polished, this table having a reciprocating longitudinal movement under a laterally-traversing or reciprocating carriage, which has mounted upon it a series of vertical rotary shafts, at the lower end of each of which is a polishing-tool fixed to and rotated by the shaft, the several polishers being pressed down to the surface of the glass by suitable springs, and the rotating motion of the polishers, together with their traversing motion across the reciprocating plate, effecting the polishing of the whole surface.

The polishers may be fixed rigidly to their shaft, the polishing-faces being then always horizontal. But as the surface of the plate to be polished is not or may not be a perfect plane, the polishers in such case fail to act uniformly upon the varying surface, and this defect we remedy by so mounting each polisher on its shaft that its friction-surface has a capability of rocking movement in every direction, and one part of our invention consists in combining with the longitudinally-reciprocating table which holds the plate, and the laterally-reciprocating carriage which carries the polishers, a gang or series of rotary polishers, each having a capability of rocking or universal movement, with reference to the surface against which it is pressed.

The drawings represent a machine embodying our invention.

A shows the machine in plan.

B is an end elevation thereof.

$a$ denotes a frame, having horizontal ways, $b$, upon which is mounted a table, $c$, for supporting the plate to be polished, this table having a reciprocating movement imparted to it by means of a gear-rack driven by a pinion on a shaft, $e$, or by any other suitable means.

Supported between two uprights, $f$, is a frame, $g$, hung from a cross-beam, $h$, upon screw-shafts $i$, by which the frame is raised and lowered. This frame has horizontal ways, $k$, upon which traverses a reciprocating carriage, $l$, having suitable bearings, in which rotates a series of vertical shafts, $m$, carrying at their lower ends the gang or series of polishers, $n$.

The frame $g$ may be raised and lowered to adjust the polishers to the surface to be polished, by means of a shaft, $o$, carrying bevel-gears $p$, meshing into and rotating gears $q$, on the screw-shaft $i$, the shaft $o$ carrying at its end a gear, $r$, rotated by a gear on a vertical shaft, $s$, this shaft being rotated by gears $t$ $u$, the latter being on the shaft of a hand-wheel, $v$.

The vertical shafts $m$, with the polishers, may be driven from gears on a cross-shaft, $w$, meshing into gears on the tops of the vertical shafts, this shaft $w$ carrying a pulley, $x$, driven from any suitable prime-mover. Each shaft, $m$, is made capable of an upward-yielding movement, it having for this purpose a spring, $z$, bearing at its upper end against one of the boxes in which the shaft runs, and at its lower end against a collar fixed upon the shaft.

The carriage $l$ is moved laterally by a screw-shaft, $a^2$, the thread of which works in a nut on the back of the carriage, and thereby imparts motion to the carriage in accordance with the direction of rotation of the screw-shaft. The direction of movement of the carriage is automatically reversed at the end of each lateral movement, by working a shipper-lever, $b^2$, by means of a rod, $c^2$, sliding loosely through an ear, $i^2$, projecting from the frame, the ear carrying nuts or collars, $d^2$, one at the limit of motion of the ear in each direction, the ear striking the nut or collar towards which it is moving, and thereby tipping the shipper-lever, and shifting the belts, as will be readily understood.

To increase or limit the extent of lateral motion in accordance with the width of the plate to be polished, the rod $c^2$ may have a screw-thread upon it, by means of which the nuts $d^2$ are adjusted in position, so that the movement of the carriage is reversed at any desired point; or the collars may be confined and adjusted in position by suitable screws.

Each polisher is made up of a disk or circular block, $e^2$, having on its lower face the polishing-cloth or other material, $f^2$, confined upon the disk by a ring or band, $g^2$, or other suitable means.

Each disk $e^2$ is connected to the shaft by which it is rotated, by a universal joint, $h^2$, this joint permitting the polishing-surface to tip or rock freely in any direction, in perfect accordance with the irregularity or unevenness of surface of the plate being polished, the spring holding the polisher down to the surface of the plate, and the joint insuring uniform contact of the polishing-surface with every part of the plate, thus securing a more perfect surface upon the plate than can be obtained in any other manner known to us.

We claim the combination of the horizontally-reciprocating table $c$, the laterally-reciprocating carriage $l$, the rotary shafts $m$, and the polishers $n$, when arranged to operate substantially as described.

We also claim giving to each polisher a capability of upward-yielding movement by means of a spring, $z$, substantially as set forth.

We also claim giving to each polisher a capability of rocking movement, substantially as described.

JONAS KENDALL,
ADDISON HATHAWAY.

Witnesses:
  FRANCIS GOULD,
  C. WARREN BROWN.